(12) United States Patent
Asami et al.

(10) Patent No.: US 7,480,013 B2
(45) Date of Patent: Jan. 20, 2009

(54) PROJECTION TYPE DISPLAY APPARATUS

(75) Inventors: Masanao Asami, Yokohama (JP); Morihiko Ota, Moriya (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 566 days.

(21) Appl. No.: 11/337,515

(22) Filed: Jan. 24, 2006

(65) Prior Publication Data

US 2006/0170837 A1    Aug. 3, 2006

(30) Foreign Application Priority Data

Jan. 28, 2005  (JP) ............ P2005-021853
Sep. 15, 2005  (JP) ............ P2005-268764

(51) Int. Cl.
*G02F 1/1335* (2006.01)
*G02B 21/00* (2006.01)

(52) U.S. Cl. ............... 349/5; 349/58; 349/50; 353/20; 353/31

(58) Field of Classification Search ............ 349/5, 349/50, 58; 353/20, 31, 33; 348/739, 744, 348/750, 757
See application file for complete search history.

(56) References Cited

U.S. PATENT DOCUMENTS 7,038,742 B2 * 5/2006 Saitoh et al. ............... 349/58

7,188,954 B2 * 3/2007 Suzuki et al. ............... 353/33

FOREIGN PATENT DOCUMENTS

| JP | 2003-202538 | 7/2003 |
| JP | 2003-241144 | 8/2003 |
| JP | 2004-205917 | 7/2004 |

* cited by examiner

*Primary Examiner*—Brian Healy
*Assistant Examiner*—Michael P Mooney
(74) *Attorney, Agent, or Firm*—The Nath Law Group; Jerald L. Meyer; Derek Richmond

(57) ABSTRACT

One of preferred embodiments of a projection type display apparatus comprises a housing including a first surface inclined at an angle of 45 degrees with respect to an optical axis of the incoming light, a second surface, and a third surface. The second and the third surface each have one edge meeting with each other so that the surfaces are joined perpendicularly with each other and another edge meeting respectively side edges of the first surface so that the surfaces are joined with the first surface. On the first surface is adhered by an adhesive a wire gird polarizer; on the second surface perpendicular to an optical axis of the light that has passed through the wire grid polarizer is adhered by the adhesive a reflection type spatial light modulation element; and on the third surface perpendicular to an optical axis of the light reflected by the wire grid polarizer is adhered by the adhesive a transmission type polarizing plate. The adhesive used has a water vapor transmission rate of 17 g/m²·day or lower.

6 Claims, 11 Drawing Sheets

PROJECTION TYPE DISPLAY APPARATUS

BACKGROUND OF THE INVENTION

1. Field of the Invention

The present invention relates to a projection type display apparatus used to magnify and project a color image.

2. Description of the Related Art

A projection type display apparatus for magnifying and projecting color image is realized into various types of configurations. Applicant has disclosed a projection type display apparatus having a wire grid polarizer for separating a polarization light from the light emitted from a light source, the polarizer being disposed in front of a reflection type spatial light modulation element (referred to as a reflection type liquid crystal panel, hereinafter) in Japanese Patent Application Laid-open Publications Nos. 2003-241144 and 2004-205917.

By the way, when the projection type display apparatus including the wire gird polarizer is commercially manufactured, it is desirable to use optical parts such as the wire grid polarizer and a reflection type LCD panel that have excellent moisture resistance, and to prevent dust and dirt from depositing therein, while realizing a high image quality by the wire grid polarizer having an excellent polarization split.

SUMMARY OF THE INVENTION

In view of the above, the present invention has been made. A first aspect of the present invention provides a projection type display apparatus comprising reflection type spatial light modulation elements provided respectively for red light, green light, and blue light; light illumination units provided respectively for red light, green light, and blue light, the light illumination units radiating respectively red light, green light, and blue light onto respective the reflection type spatial light modulation elements provided respectively for red light, green light, and blue light; wire grid polarizers provided respectively for red light, green light, and blue light, the wire grid polarizers allowing a first-polarization component included in the red light, the green light, and the blue light radiated by respective the light illumination units to pass therethrough and reflecting a second-polarization component that has been reflected and light-modulated by respective the reflection type spatial light modulation elements provided respectively for red light, green light, and blue light; housings provided respectively for red light, green light, and blue light, each of the housings taking a shape of a triangular-based hollow column defined by a triangular lower surface, a triangular upper surface, a first surface arranged inclined at an angle of 45 degrees with respect to an optical axis of the light incoming from the light illumination units, a second surface arranged perpendicular to an optical axis of the light that has passed through the wire grid polarizers, and a third surface, the first surface, the second surface, and the third surface being disposed between the triangular upper surface and the triangular lower surface, wherein the wire grid polarizers are adhered on respective the first surfaces by an adhesive, wherein the reflection type spatial light modulation elements are adhered on respective the second surfaces by the adhesive, and wherein the third surfaces are arranged so as to allow the second polarization component reflected respectively by the wire grid polarizers to pass therethrough; a color combination optical system that color-composes the red light, the green light, and the blue light of the second polarization that each have passed through respective the third surface of the housings provided respectively for red light, green light, and blue light, and allows the color-composed light to pass therethrough; and a projection lens that projects the color-composed light. In the projection type display apparatus, the adhesive has a water vapor transmission rate of 17 g/m²·day or lower.

A second aspect of the present invention provides a projection type display apparatus according to the first aspect, wherein transmission type polarizing plates provided respectively for red light, green light, and blue light, the transmission type polarizing plates excluding a first polarization component included in the red light, the green light, and the blue light that have been reflected by respective the wire grid polarizers and allowing a second polarization component to pass therethrough, are adhered by the adhesive respectively on the third surfaces of the housings provided respectively for red light, green light, and blue light.

A third aspect of the present invention provides a projection type display apparatus according to the first aspect, wherein reflection type polarizing plates provided respectively for red light, green light, and blue light, the reflection type polarizing plates excluding a first polarization component included in the red right, the green light, and the blue light that have been reflected by respective the wire grid polarizers and allowing a second polarization component to pass therethrough, are adhered by the adhesive respectively on the third surfaces of the housings provided respectively for red light, green light, and blue light.

A fourth aspect of the present invention provides a projection type display apparatus according to the first aspect, wherein transparent glass plates provided respectively for red light, green light, and blue light, the transparent glass plates allowing the red light, green light, and blue light that have been reflected by respective the wire grid polarizers, are adhered by the adhesive respectively on the third surfaces of the housings provided respectively for red light, green light, and blue light; and wherein transmission type polarizing plates provided respectively for red light, green light, and blue light, the transmission type polarizing plates excluding a first polarization component included in the red light, the green light, and the blue light that have been reflected by respective the wire grid polarizers and allowing a second polarization component to pass therethrough, are adhered by the adhesive respectively on the incident surfaces of the color combination optical system.

A fifth aspect of the present invention provides projection type display apparatus as recited in claim 1, wherein a transparent glass plate allowing the red light reflected by the wire grid polarizer for red light to pass therethrough is adhered by the adhesive on the third surface of the housing for red light; wherein a transparent glass plate allowing the green light reflected by the grid polarizer for green light to pass therethrough is adhered by the adhesive on the third surface of the housing for green light; wherein a reflection type polarizing plate for blue light is adhered by the adhesive on the third surface of the housing for blue light, the transmission type polarizing plate excluding a first polarization component included in the blue light that has been reflected by the wire grid polarizer to allow a second polarization component to pass therethrough; and wherein a transmission type polarizing plate is attached on an incident surface for red light of the color combination optical system, the transmission type polarizing plate excluding a first polarization component included in the red light that has passed through the transparent glass plate for red light, and a transmission type polarizing plate is attached on an incident surface for green light of the color combination optical system, the transmission type polarizing plate excluding a first polarization component included in the green light that has passed through the transparent glass plate for green light.

A sixth aspect of the present invention provides a projection type display apparatus according to the first aspect, wherein the housings are filled with inert gas at a pressure range of equal to or higher than 1 atmosphere and lower than 2 atmospheres.

According to the first aspect of the present invention, since the wire grid polarizer as a polarization separation means and the reflection type spatial light modulation element (reflection type liquid crystal panel) as an image formation means are adhered by the adhesive having a water vapor transmission rate of 17 g/m$^2$·day or lower on the first surface and the second surface of the housing, respectively, an amount of moisture that can hinder a practical use is prevented from easily entering the housing and thus condensing therein. Therefore, there is reliably provided the projection type display apparatus of which moisture resistance in the housing is highly improved even under a severe environment with high fluctuations of temperature and humidity.

According to the second aspect of the present invention, since the transmission type polarizing plates provided respectively for red light, green light and blue light as means for separating unwanted light are adhered by the adhesive having a water vapor transmission rate of 17 g/m$^2$·day or lower on the third surface of the respective housings for red light, green light, and blue light, unwanted first-polarization component can be excluded by the transmission type polarizing plate, thereby improving an image quality of the projected image, while retaining the same effect exercised by the first aspect of the present invention.

According to the third aspect of the present invention, since the reflection type polarizing plates provided respectively for red light, green light and blue light as means for separating unwanted light are adhered by the adhesive having a water vapor reflection rate of 17 g/m$^2$·day or lower on the third surface of the respective housings provided respectively for red light, green light, and blue light, unwanted first-polarization component can be excluded to a greater extent by the reflection type polarizing plate having high heat and light resistance, thereby improving further an image quality of the projected image, while retaining the same effect exercised by the first aspect of the present invention.

According to the fourth aspect of the present invention, the transparent glass plates provided respectively for red light, green light, and blue light are adhered by the adhesive having a water vapor reflection rate of 17 g/m$^2$·day or lower on the third surface of the housing provided respectively for red light, green light, and blue light, thereby retaining the same effect exercised by the first aspect. In addition, the transmission type polarizing plates provided respectively for red light, green light, and blue light for excluding a first polarization component from the red light, green light, and blue light that have passed through the respective transparent glass plates are attached on the respective incident surfaces of the three-color combination optical system, thereby improving an image quality of the projected image.

According to the fifth aspect of the present invention, the transparent glass plates respectively for red light and green light for allowing the red light and the green light to pass therethrough are adhered by the adhesive having a water vapor reflection rate of 17 g/m$^2$·day or lower respectively on the third surface of the respective housings for red light and green light, and the reflection type polarizing plate for blue light as means for separating unwanted light is adhered by the adhesive having a water vapor reflection rate of 17 g/m$^2$·day or lower on the third surface of the housing for blue light, thereby retaining the same effect exercised by the first aspect of the present invention. In addition, the transmission type polarizing plate for red light and green light for excluding unwanted first polarization component from the red light and the green light that have passed through the respective transparent glass plates for red light and green light is attached on the respective incident surface of the color combination optical system, thereby excluding the first polarization component included in the red light and the green light. Furthermore, the first polarization component included in the blue light is excluded by the reflection type polarizing plate adhered on the third surface of the housing for blue light, the reflection type polarizing plate having higher heat and light resistance.

According to the sixth aspect of the present invention, since the housing taking a shape of a triangular-based hollow column of the projection type display apparatus according to one of the first to the fifth aspect is filled with inert gas at a pressure of 1 atmosphere or higher and lower than 2 atmospheres and sealed airtight, dust and dirt is prevented from easily entering the housing from outside, thereby leading to an improved quality and reliability of the projection type display apparatus.

DESCRIPTION OF THE PREFERRED EMBODIMENTS

Referring to FIGS. 1 to 13, preferred embodiments of the projection type display apparatus according to the present invention will be described in detail.

First Embodiment

Figure 1:
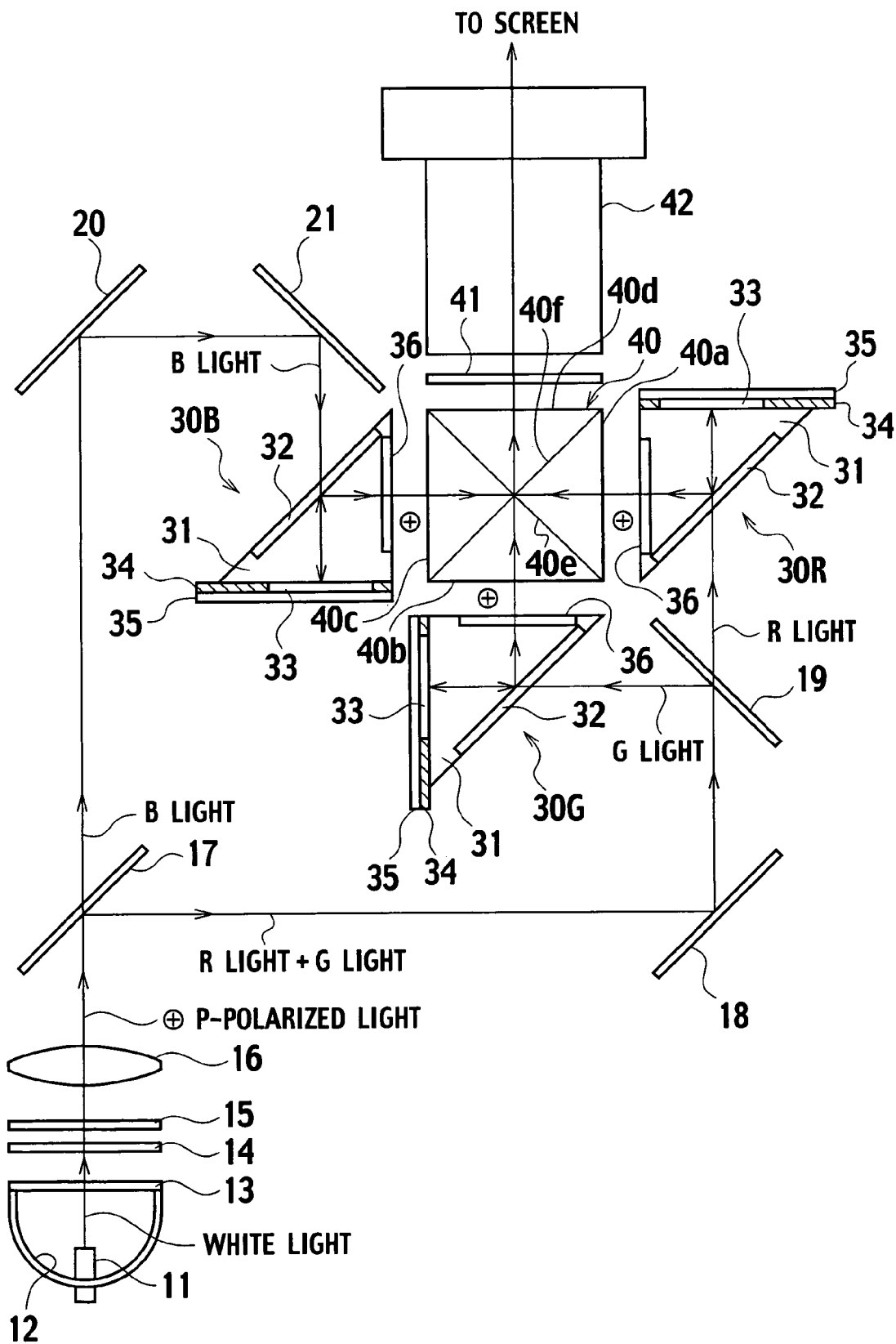
FIG. 1 is a plain view of a projection type display apparatus according to a first embodiment of the present invention.
Figure 2:
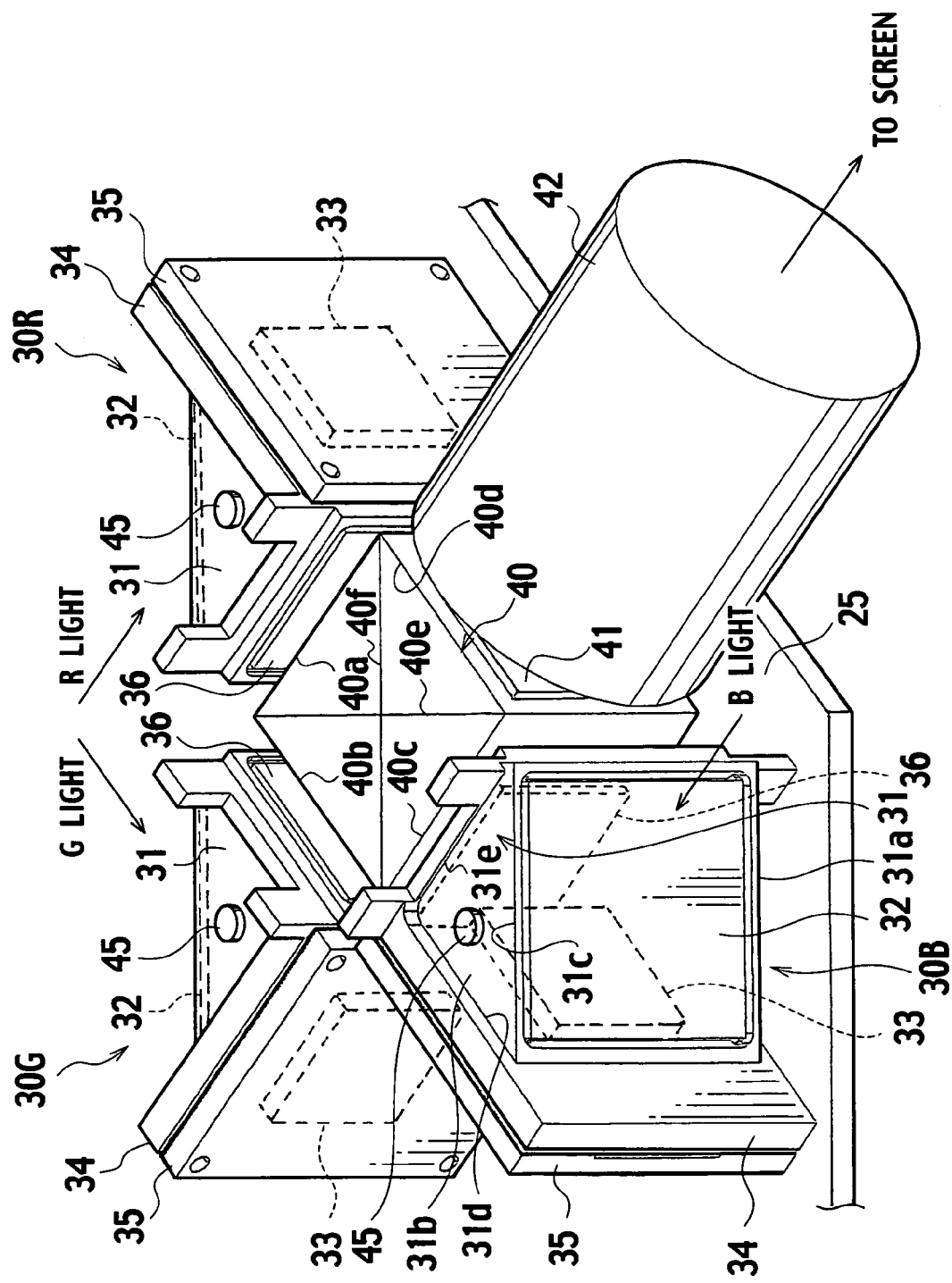
FIG. 2 is a perspective view of reflection type liquid crystal panel assemblies respectively for R, G, and B lights, three-color combination cross dichroic prism and a projection lens of the projection type display apparatus according to the first embodiment, seen slantly upward from the reverse side of these components.
Figure 3A:
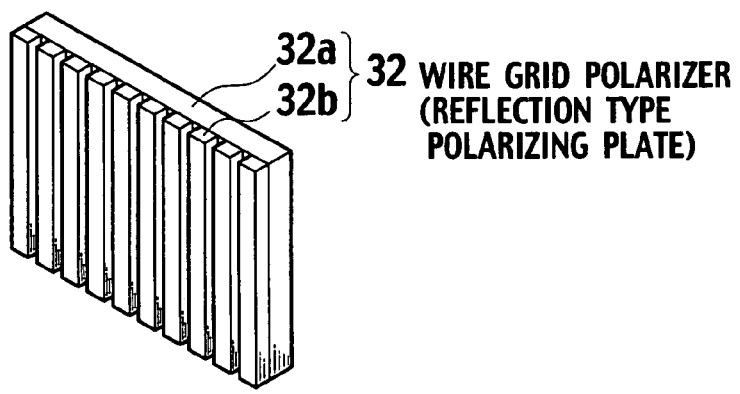
FIGS. 3A to 3C are an explanatory view of a wire grid polarizer provided in each of the projection type liquid crystal panel assemblies in the projection type display apparatus according to the first embodiment.
Figure 3B:
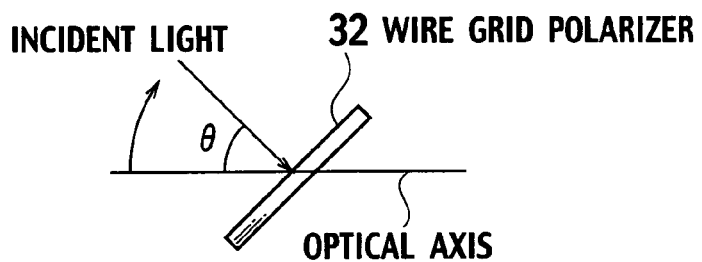
Figure 3C:
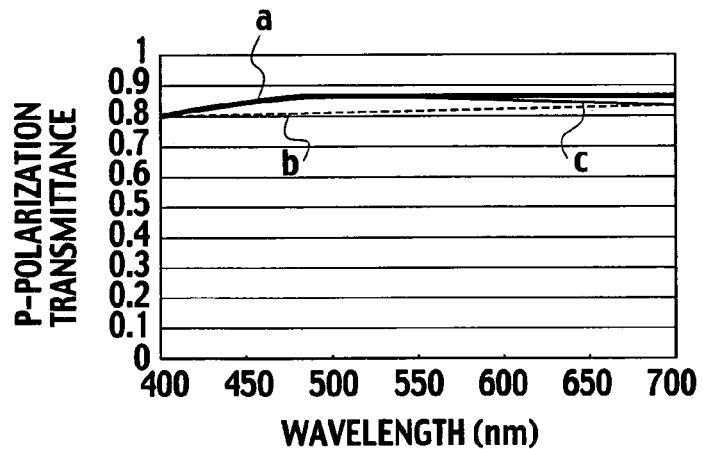

FIG. 1 is a plain view of a projection type display apparatus according to a first embodiment of the present invention. FIG. 2 is a perspective view of reflection type liquid crystal panel assemblies respectively for R, G, and B lights, three-color combination cross dichroic prism and a projection lens of the projection type display apparatus according to the first embodiment, seen slantly upward from the reverse side of these components. FIGS. 3A to 3C are an explanatory view of a wire grid polarizer provided in each of the projection type liquid crystal panel assemblies in the projection type display apparatus according to the first embodiment.

As illustrated in FIG. 1, a projection type display apparatus 10A according to the first embodiment of the present invention is configured so as to include reflection type spatial light modulation elements corresponding respectively to R, G, and B lights.

In the projection type display apparatus 10A, there are arranged on the same plane a light source 11 for radiating non-polarized white light, a color-separation optical system 17, 19 that separate the white light radiated from the light source 11 into R, G, and B lights, reflection type spatial light modulation elements (reflection type liquid crystal panels) 33 respectively for R, G, and B light, a three-color combination cross dichroic prism 40 that color-composes image light in each color, the image light having been modulated by the reflection type liquid crystal panels 33 respectively for R, G, and B lights, and a projection lens 42 that projects the color-composed image light produced by the three color cross dichroic prism 40.

The light source 11 uses an electric lamp such as but not limited to a metal-halide, xenon, or halogen lamp to radiate non-polarized white light containing R, G, and B components of the spectrum. The white light radiated from the light source 11 is reflected by a paraboloidal mirror 12 to become substantially parallel light that then enters a first fly eye lens array 13 provided on the front opening of the paraboloidal mirror 12 and a second fly eye lens array 14 provided in front of the first fly eye lens array 13 in this order. The first and the second fly eye lens array 13, 14 cooperatively constitute an integrator that uniformizes illumination intensity in the flux of the white light. By the way, there may be arranged a non-visible light eliminating filter (not shown) that cuts ultraviolet and infrared light in front of the light source 11.

Then, the non-polarized white light of which illumination intensity is uniformized by the first and the second fly eye lens arrays 12, 13 is incident on a polarization conversion prism array 15 as a polarization conversion optical element. The polarization conversion prism array 15 is configured into a plate shape as a whole, having a polarization separation prism array and a λ/2 phase plate. The light incident on the polarization light conversion prism array 15 is separated into a P-polarization component and an S-polarization component by a polarization beam splitter film surface that is also included in the polarization conversion prism array 15. The polarization directions are represented in relation to the splitter film surface.

By the way, the polarization conversion prism array 15 has a plurality of polarization beam splitter film surfaces that are arranged parallel with one another and inclined at an angle of 45 degrees with respect to the main surface of the polarization conversion prism array 15. With this configuration, the P-polarization component passes therethrough and exit from the front surface of the polarization conversion prism array 15, whereas the S-polarization component is reflected by one polarization beam splitter film surface so as to be deflected by an angle of 90 degrees and then reflected by the adjacent polarization beam splitter film surface by the same angle again to finally exit from the front surface.

In an area to which such an S-polarization component (the S-polarization component reflected twice by the polarization beam splitter film surface) proceeds, the ½ phase plate is provided. The S-polarization component that has passed through the ½ phase plate undergoes a 90 degree rotation to have the same polarization direction as that of the P polarized component that has passed through the polarization beam splitter film surface. In this manner, after passing through the polarization conversion prism array 15, the non-polarized white light from the light source 11 turns into polarization light having one polarization direction.

In the first embodiment, the light that has passed through the polarization conversion prism array 15 is converted to polarized light for example having P-polarization. However, since a polarization conversion efficiency is not 100%, the exiting light from the polarization conversion prism array 15 includes several to several tens percent of S-polarized light.

By the way, the polarization direction of the light that exits from the polarization conversion prism array 15 is assumed to be P (a first polarization light) in the following description. However, the direction is not really limited to P. It is readily apparent to one of ordinary skill in the art that the non-polarized white light can be polarized into S-polarization component by the polarization conversion prism array 15.

The P-polarized white light that has exited from the polarization conversion prism array 15 passes though a field lens 16 and then enters the color-separation optical system (a first dichroic mirror) 17. The first dichroic mirror 17 reflects the R and G lights, which have been included in the white light, to change the proceeding direction thereof by 90 degrees and allows the remaining B light to proceed forward.

The R and G lights reflected by the first dichroic mirror 17 are incident on a first metal film reflection mirror 18 and deflected by 90 degrees by the mirror 18 to enter a second dichroic mirror 19. The color-separation optical system (a second dichroic mirror) 19 allows the R light to pass therethrough. As a result, the R light enters a reflection type liquid crystal panel assembly 30R for R light. On the other hand, the second dichroic mirror 19 reflects the G light to change the proceeding direction thereof by 90 degrees toward a reflection type liquid crystal panel assembly 30G for G light.

The B light that has passed through the first dichroic mirror 17 is reflected by a second metal film reflection mirror 20 and then by a third metal film reflection mirror 21 to enter a reflection type liquid crystal panel assembly 30B for B light.

From the foregoing, the first and the second dichroic mirror 17, 19 constitute the color-separation optical system that separates the white light radiated from the light source 11 into R, G, and B lights. Each constituting part including from the light source 11 to the color separation optical system 17, 19 serves as an illumination units for respective color lights that illuminates the reflection type liquid crystal panels (reflection type spatial modulation elements) 33 for respective color lights.

By the way, the first embodiment describes where the white light from the light source 11 is color-separated into R, G, and B lights by the color separation optical systems 17, 19. However, the present invention is not necessarily limited to this embodiment. The projection type display apparatus according to the present invention can be embodied by providing light emitting diode (LED) light sources respectively for R, G, and B light in place of the color separation optical systems 17, 19. In such a display apparatus, the R, G, and B lights emitted respectively from the LED light sources are polarized to one direction polarization (first polarization) light and then radiated respectively on the reflection type liquid crystal panels 33 for R, G, and Blights. Namely, the LED light sources serve as the illumination units, which is also applicable to the subsequent embodiments 2 to 4.

Returning to the first embodiment, the reflection type liquid crystal panel assembles 30R, 30G, 30B respectively for R, G, and B lights all have the same configuration and oppose incident surfaces 40a, 40b, 40c of a three-color combination cross dichroic prism 40, respectively, leaving a predetermined distance therebetween. The prism 40 serve as the color combination optical system and is formed into a shape of rectangular solid.

The reflection type liquid crystal panel assemblies 30R, 30G, 30B and the three color combination cross dichroic prism 40 are attached on a base 25 made for example of aluminum or the like by an adhesive as illustrated in FIG. 2.

In addition, the reflection type liquid crystal panel assemblies 30R, 30G, 30B each are configured into a shape of a right-angle triangular-based hollow column (referred to as a right-angle triangular prism housing, or as a housing for short, hereinafter) 31 defined by an upper plane 31b, a lower plane 31a, both of which are formed into a shape of a right-angle triangle using sheet metal, a first surface 31c that is inclined against an optical axis for each light originated by the light illumination units composed of the parts from the light source 11 (FIG. 1) through the color separation optical systems 17, 19 (FIG. 1), a second surface 31d, and a third surface 31e, both of which are perpendicular to each other and respectively meet at one edge two edges of the first surface 31c, as shown in FIG. 2.

There is attached a wire grid polarizer 32 by an adhesive on the first surface 31c that is arranged so as to be inclined at an angle of 45 degrees against the optical axis of the light originated from the light illumination units composed of the parts from the light source 11 (FIG. 1) through the color separation optical systems 17, 19 (FIG. 1) and is a constituting part of the right-angle triangular prism housings 31 provided respectively for R, G, and B lights. The wire gird polarizer 32 serves to allow the first-polarization light included in the light having R, G, or B light coming from the light illumination units to pass therethrough and reflect a second-polarization light that is produced after the first-polarization light is incident on a reflection type liquid crystal panel (reflection type spatial light modulation element) 33, modulated and reflected. In addition, the reflection type liquid crystal panel 33 is attached by an adhesive using an aperture mask 34 on the second surface 31d arranged so as to be perpendicular to the optical axis of the light passing through the wire grid polarizer 32.

In addition, there is attached a transmission type polarizing plate 36 by an adhesive on the third surface 31e that is arranged so as to be perpendicular to the optical axis of the second polarization light reflected by the reflection type liquid crystal panel 33 and then the wire grid polarizer 32. The transmission type polarizing plate 36 serves to exclude unwanted first-polarization light included in the light reflected by the wire grid polarizer 32 and to allow the second-polarization light to pass therethrough.

In other words, the wire gird polarizer 32 is adhered on the first surface 31c of the right-angle triangular prism housing 31, the first surface 31c being inclined at an angle of 45 degrees; the reflection type liquid crystal panel 33 is adhered on the second surface 31d; and the transmission type polarizing plate 36 is adhered on the third surface 31e which is perpendicular to the second surface 31d. The second surface 31d and the third surface 31e respectively meet at one edge the first surface 31c of the right-angle triangular prism housing 31.

By the way, the aforementioned right-angle triangular prism housing does not necessarily take the shape as stated previously. Namely, while the first surface 31c having the wire grid polarizer 32 for each color adhered thereon has to be inclined at an angle of 45 degrees against the second surface 31d having the reflection type liquid crystal panel 33 adhered thereon, the angle between the second surface 31d and the third surface 31e is not necessarily limited to 90 degrees, as far as the second-polarization light for each color that has been reflected by the wire grid polarizer 32 of each color adhered on the first surface 31c can pass through the third surface 31e.

The inside space of the right-angle triangular prism housing 31 defined by the lower plane 31a, the upper plane 31b, the first surface 31c, the second surface 31d, and the third surface 31e is preferably filled with inert gas such as but not limited to nitrogen or argon at a pressure of 1 atmosphere (101.325 kPa) or higher, which is easily carried out by using a lid 45 provided in the upper plane 31b, and sealed airtight. Since the right-angle triangular prism housing 31 is gas-pressurized and kept airtight, dust and dirt can be prevented from entering the housing 31. The right-angle triangular prism housing 31 being kept airtight is arranged so that the transmission type polarizing plates 36 respectively for R, G, and B lights oppose the incident faces 40a, 40b, 40c of the three-color combination cross dichroic prism 40, respectively, leaving a predetermined distance therebetween.

In addition, the wire grid polarizers 32, the reflection type liquid crystal panel 33, and the transmission type polarizing plate 36, all of which are provided on the triangular prism housings 31 respectively for R, G, and B lights, are provided upright on the base 25.

The reflection type liquid crystal panel 33 is attached into the aperture mask plate 34 that is to define the position thereof and thus provided integrally on the right-angle triangular prism housing 31, while on the back face of the reflection liquid crystal panel 33 is provided a heat sink 35 for releasing heat. By the way, the reflection liquid crystal panel 33 may be adhered directly on the second surface 31d by an adhesive without using the aperture mask plate 34.

When the R light of P-polarization (the first polarization) enters the reflection type liquid crystal panel assembly 30R for R light, the R right passes through the wire grid polarizer 32 attached on the right-angle triangular prism housing 31 and then enters the reflection type liquid crystal panel 33 for R light.

The aforementioned wire grid polarizer 32 is a sort of a plate-shaped reflection type polarizing plate as a polarization separator for separating polarized light from the light radiated from the light source 11 (FIG. 1). As illustrated in FIG. 3A, the wire grid polarizer 32 is configured in a way that a plurality of metal lines 32b made of Aluminum or the like are provided on an optical glass plate 32a so as to be arranged into a stripe with intervals of 140 nm between each line. The wire grid polarizer 32 has a function that allows light having a polarization perpendicular to the metal lines 32b (for example, P-polarized light) to pass therethrough and reflects light having a polarization parallel to the metal lines 32b (for example, S-polarized light).

FIG. 3C illustrates a wavelength dependence of transmittance of P-polarization component, taking as a parameter a light-incident angle θ (FIG. 3B) in relation to the wire grid polarizer 32. In FIG. 3C, lines "a", "b", and "c" indicate the dependence when incident angles θ are 0, −15, and +15 degrees, respectively. By the way, the light-incident angle θ is defined as an angle of the incoming light with respect to an optical axis against which the incident surface of the wire grid polarizer 32 is inclined at an angle of 45 degrees. In the wire grid polarizer 32, even when the incident angle θ deviates from the optical axis by +/−15 degrees, the transmittance of the P-polarized light does not depend greatly on the wavelength of the light, which is indicative of high stability.

As a result, it has been found that the wire grid polarizer 32 realizes a bright image having a high color-reproducibility. In addition, the wire grid polarizer 32 provides an advantage of lightweight because it is configured into a shape of plate. Moreover, the wire grid polarizer 32 is capable of preventing image quality degradation caused by birefringence since the polarizer 32 is not likely to absorb the light radiated from the light source 11 (FIG. 1).

Referring again to FIGS. 1 and 2, when the R light of P-polarization (the first polarization) that has passed through the wire grid polarizer 32 for R light enters the reflection type liquid crystal panel 33 for R light, the R light is light-modulated by the reflection type liquid crystal panel 33 for R light in accordance with an image signal for R light, the signal being applied to the liquid crystal panel 33, and then reflected back to reach the wire grid polarizer 32 for R light. In this case, the wire grid polarizer 32 for R light reflects only the R light of S-polarization (the second polarization), which is produced when the R light of P-polarization (the first polarization) has been incident on and light-modulated by the reflection type liquid crystal panel 33 for R light.

By the way, the reflection type liquid crystal panel 33 is composed of a plurality of switching elements arranged into a matrix on a silicon substrate, a plurality of pixel electrodes respectively arranged above the matrix switching elements with an insulating layer therebetween, liquid crystal filled between the plurality of pixel electrodes and a common electrode provided on a transparent substrate. When a voltage is applied across the plurality of pixel electrodes and the common electrode, the light incident upon the incident surface from the transparent substrate is light-modulated in accordance with the image signal and then reflected by the plurality of pixel electrodes as image light. This is why the panel 33 is called a reflection type liquid crystal panel. The reflection type liquid crystal panel 33 having such a configuration enjoys a high degree of pixel integration and thus is suitable for high-resolution image. In addition, since electric circuits can be integrated underneath the plurality of pixel electrodes, an aperture ratio can be increased up to about 90%, thereby offering an advantage of a bright, smoothly rendered, and highly-defined image.

The R light of S-polarization that has been reflected by the wire grid polarizer 32 for R light is incident upon the transmission type polarizing plate 36 provided in the right-angle triangular prism housing 31 for R light so as to oppose the three-color combination cross dichroic prism 40 and serves as means for excluding unwanted polarized light. Due to the transmission type polarizing plate 36, the R light of P-polarization existing in the incident light is excluded and thus only the R light of S-polarization passes therethrough. After this, the R light of S-polarization is incident upon the incident surface 40a of the three-color combination cross dichroic prism 40.

By the way, if P-polarized light remains in the light that has been reflected by the wire grid polarizer 32, it reduces a contrast ratio of the image to be displayed. This is why the transmission type polarizing plate 36 is provided as means for excluding the unwanted P-polarized light.

The transmission type polarizing plate 36 is configured by staining a base film (for example, polyvinyl alcohol (PVA)) with a dichroic material such as but not limited to iodine or organic dye, drawing the stained film to be oriented to develop absorption dichroic properties, sandwiching the PVA polarization layer with triacetylcellulose (TAC) films to obtain a polarization film, and attaching the polarization film on a glass substrate with a cohesion or adhesion agent. The transmission type polarizing plate 36 based upon the absorption dichroic properties absorbs the light having one polarization direction that is the same as the orientation of the chromatic dye and allows the light having the other polarization direction to pass therethrough.

Since the transmission type polarizing plate 36 is configured as an absorption type, it is preferably made of a substrate having a high thermal conductivity, for example, a substrate made of quartz or sapphire, taking heat resistance and heat dissipation into consideration. In order to improve a utilization rate of light and to prevent image quality from being deteriorated by unwanted reflection taking place in a boundary face between the transmission type polarizing plate 36 and air, an anti-reflection coating is necessary in the boundary. When providing an anti-reflection coating, polarization properties and anti-reflection properties have to be optimized preferably for R, G, and B lights.

The transmission type polarizing plate 36 may be made of a single-sided film. However, since it is difficult to flatten the surface of the film to an order of wavelength while irregularity of the film surface deteriorates an image resolution, it is preferable in order to realize a higher resolution of the image that the polarization film is sandwiched by substrates that have been polished to optical grade smoothness, the substrate being made of for example highly transmitting glass, optical glass, crystalline quartz, quartz and sapphire, and the irregularity is filled with a cohesion and adhesion agent. With these countermeasures, the image resolution is prevented from degrading.

While the above explanation is mainly centered on the reflection type liquid crystal panel assembly 30R, the same is true for the reflection type liquid crystal panel assemblies 30G, 30B. Namely, when the G (B) light is incident on the reflection type liquid crystal panel assembly 30G (30B), the light is optically modulated and reflected to become S-polarized G (B) light by the reflection type liquid crystal panel 33 (33) and then enters the incident surface 40b (40c) of the three-color combination cross dichroic prism 40 (40).

R, G, and B image lights (or, light-modulated lights) incident respectively upon the incident surfaces 40a, 40b, 40c are color-composed by a first dichroic film 40e and a second dichroic film 40f formed inside the three-color combination cross dichroic prism 40. Then, the color-composed light obtained by the three-color combination cross dichroic prism 40 exits out from an exit plane 40d and enters a projection lens 42 after passing through λ/4 wavelength plate 41. By the projection lens 42, the color-composed light is magnified and projected on a screen (not shown).

The above-mentioned three-color combination cross dichroic prism 40 is formed of optical grade glass into a shape of rectangular solid or cuboid. When seen from above, the first dichroic film 40e and the second dichroic film 40f crisscross with each other to take a shape of "X".

The first dichroic film 40e of the three-color combination cross dichroic prism 40 reflects the R light incoming from the incident surface 40a so as to change the proceeding direction thereof by 90 degrees to allow the reflected light to exit from the exit plane 40d. In addition, the first dichroic film 40e allows the G light incoming from the incident surface 40b to pass therethrough to exit from the exit plane 40d. Moreover, the first dichroic film 40e allows the B light incoming from the incident surface 40c to pass therethough.

The second dichroic film 40f of the three-color combination cross dichroic prism 40 reflects the B light incoming from the incident surface 40c to change the proceeding direction thereof by 90 degrees to allow the reflected light to exit from the exit plane 40d. In addition, the first dichroic film 40f allows the G light incoming from the incident surface 40b to pass therethrough to exit from the exit plane 40d. Moreover, the first dichroic film 40f allows the R light incoming from the incident surface 40a to pass therethough.

Therefore, three-color combination is carried out by the first and the second dichroic film 40e, 40f formed inside the three-color combination cross dichroic prism 40.

The λ/4 wavelength plate 41 is provided, if needed, between the three-color combination cross dichroic prism 40 and the projection lens 42 in order to prevent unnecessary light or ghost from appearing. The ghost is generated in such a way that a little amount of light is reflected by the surface of the projection lens 42 to return back to the reflection type liquid crystal panel 33 by way of the three-color combination cross dichroic prism 40, the transmission type polarizing plate 36, and the wire grid polarizer 32 in this order, and then is reflected by the panel 33 to reach the screen through the projection lens.

Next, referring to FIGS. 4 to 6, there will be described the adhesive used to adhere the wire grid polarizer 32, the reflection type liquid crystal panel 33 and the transmission type polarizing plate 36 onto the first, the second, and the third surface 31c, 31d, 31e, respectively, the surfaces 31c, 31d 31e being a part of the right-angle triangular prism housings 31 for R, G, and B light which is a substantial portion of the first embodiment.

Figure 4:
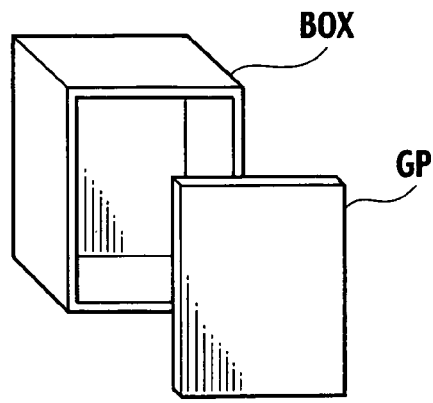
FIG. 4 is a perspective view illustrating how a preliminary experiment is carried out using adhesives having various values of water vapor transmission rate.

FIG. 4 is a perspective view illustrating how a preliminary experiment is carried out using adhesives having various values of water vapor transmission rate. FIG. 5 is a summary of the experiment results. FIG. 6 illustrates a temperature (Celsius) dependence of the water vapor transmission rate of the adhesive and a relation between a dew point and a water vapor transmission rate.

One example of the adhesives that can be suitably used to adhere the wire grid polarizer 32, the reflection type liquid crystal panel 33 and the transmission type polarizing plate 36 onto the first surface 31c, the second surface 31d, and the third surface 31e, respectively, is an ultraviolet curable epoxy resin adhesive XNR-5516 (product name) of Nagase ChemiteX Corporation. Specifically, the ultraviolet curable epoxy resin adhesive XNR-5516 (product name) having a water vapor transmission rate of 17 g/m$^2$·day or less after being cured (or, in epoxy resin) when measured in compliance with Japanese Industrial Standard (JIS) Z 0208 was used. The reason why this particular adhesive is used will be explained later.

By the way, the aforementioned water vapor transmission rate is also called a moisture vapor transmission rate and defined as an amount of gaseous H$_2$O passing through a barrier per unit area and time under a predetermined temperature and humidity. The water vapor transmission rate is expressed by a unit of g/m$^2$·day or g/m$^2$·24 hour.

In order to cure the above epoxy resin adhesive XNR-5516 (product name), a Xenon mercury ultraviolet lamp illumination apparatus with an optical fiber (not shown) is used. Specifically, the light from this apparatus is radiated onto the adhesive at an illumination intensity of 100 mW/cm$^2$ for one minute. Then the adhesive is kept at 80 degrees Celsius for about one hour in a thermostatic oven in order to harden sufficiently. By the way, although the ultraviolet curable epoxy resin adhesive XNR-5516 (product name) of Nagase ChemiteX Corporation needs heat hardening after ultraviolet curing as stated above, the heat hardening is not necessary when an adhesive is used that requires ultraviolet curing only.

Prior to the preliminary experiment using the ultraviolet curable epoxy resin adhesive XNR-5516 (product name) of Nagase ChemiteX Corporation, a water vapor transmission rate measurement in compliance with JIS Z 208 was carried out for the adhesive. From the measurement results, four types of the resin having a water vapor transmission rate of 5, 16, 28, and 41 g/m$^2$·day have been chosen for use in the experiment.

The preliminary experiment was carried out using an aluminum cuboid container BOX having the same inner volume as the right-angle triangular prism housing 31 and a glass plate GP, as illustrated in FIG. 4. Four edge portions of the glass plate GP, the portion meeting the brim of the container, were covered fully with the adhesives each having a water vapor transmission rate of 5, 16, 28, and 41 g/m$^2$·day to caulk the glass plate GP with the container BOX, thereby sealing the container BOX airtight. It is needless to say that four pairs of the containers BOX and the glass plates GP were prepared and used for each adhesive. Then, the adhesive was cured and hardened by the above-mentioned method.

Next, the four containers BOX having the glass plate GP adhered thereon with the adhesive were kept at 60 degrees Celsius under a humidity of 90% for one week and then kept at a room temperature (25 degrees Celsius) for long enough to be cooled. Then, the inside of the container BOX was observed.

If water vapor has entered the inside of the cuboid container BOX made of aluminum at 60 degrees Celsius, it precipitates as mist on the inner face of the glass plate GP at a room temperature (25 degrees Celsius). Therefore, an area of mist on the inner face of the glass plate GP can be used for evaluating an amount of water vapor entering to the container BOX. The results are summarized in FIG. 5.

Figures 5, 6:
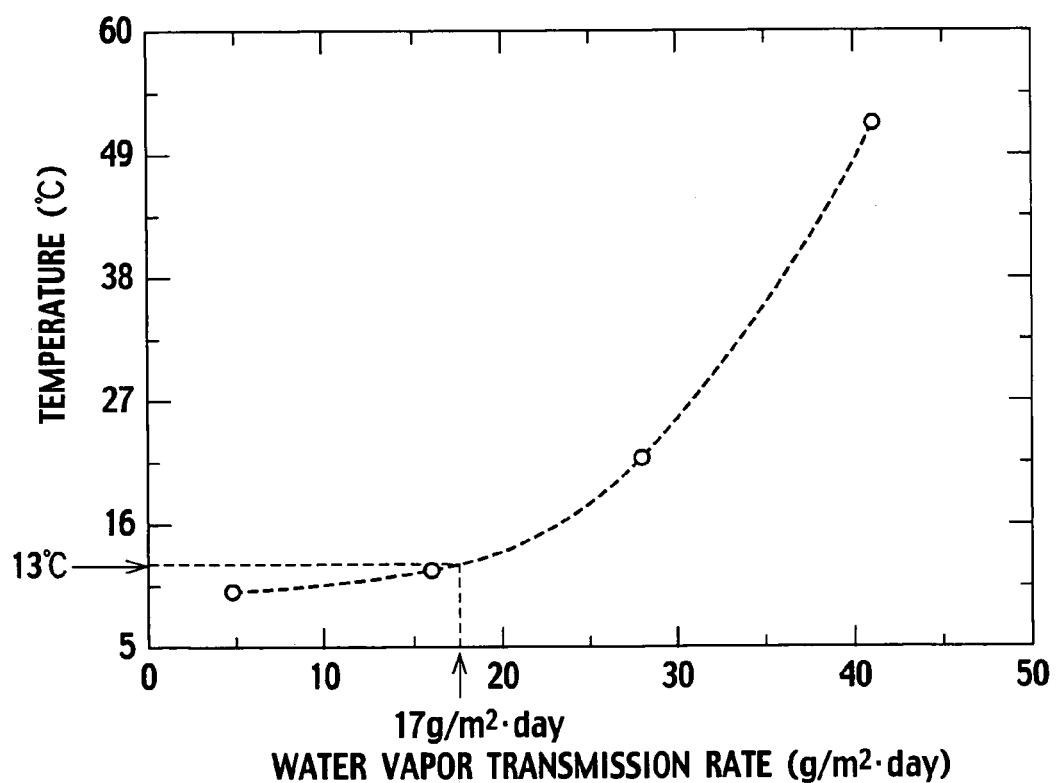
FIG. 5 is a summary of the experiment results.
FIG. 6 illustrates a temperature (Celsius) dependence of the water vapor transmission rate of the adhesive and a relation between a dew point and a water vapor transmission rate.

Apparently from FIG. 5, no mist is observed on the glass plate GP when the epoxy resin adhesives each having a water vapor transmission rate of 5 and 16 g/m$^2$·day are used. However, when the adhesives each having a water vapor transmission rate of 28 and 41 g/m$^2$·day are used, an area of mist is observed on the glass plate GP. In addition, the larger the water vapor transmission rate is, the larger the area of mist becomes.

Regarding the aforementioned adhesive, further examination was carried out to evaluate the water vapor transmission rate. If water vapor penetrates between the glass plate GP and the cuboid container BOX, the humidity inside is increased compared with them right after they are adhered with each other.

When temperature and humidity are assumed as 22 degrees Celsius and 60%, respectively, in the environment surrounding the glass plate GP and the cuboid container BOX at the time of adhering each other, the container BOX has to contain moisture of 11.66 g/m³ therein after being hermetically sealed with the glass plate GP. Then, when the temperature is decreased, the vapor pressure is saturated at 13 degrees Celsius, that is, dew condensation begins at 13 degrees Celsius.

In case the aforementioned four adhesives each having a different water vapor transmission rate are used to adhere the glass plate GP on the container BOX at the above atmosphere, the temperature at which dew condensation begins has been investigated. The results are summarized as a relation between the water vapor transmission rate and a dew point in FIG. 6.

In FIG. 6, the horizontal axis represents the water vapor transmission rate in a unit of g/m²·day and the vertical axis represents a temperature in a unit of degree Celsius. Apparently from FIG. 6, the adhesive having a water vapor transmission rate of 17 g/m²·day gives the dew point of 13 degrees Celsius.

From the foregoing, it has been found that there is hardly a problem which originates from moisture penetration and thereby affects a practical use when the adhesive having a water vapor transmission rate of 17 g/m²·day or lower is used in the right-angle triangular prism housing 31. Therefore, moisture resistance is improved in the right-angle triangular prism housing 31, which is true even under a severe environment with high fluctuations of temperature and humidity, thereby providing a reliable projection display apparatus 10A according to the first embodiment.

Next, referring to FIG. 7, there will be described how inert gas such nitrogen or argon is filled inside the right-angle triangular prism housings 31 respectively for R, G, and B light when the reflection type liquid crystal panel assemblies 30R, 30G, 30B, for R, G, and B light, which are a substantial portion of the first embodiment, are assembled.

Figure 7:
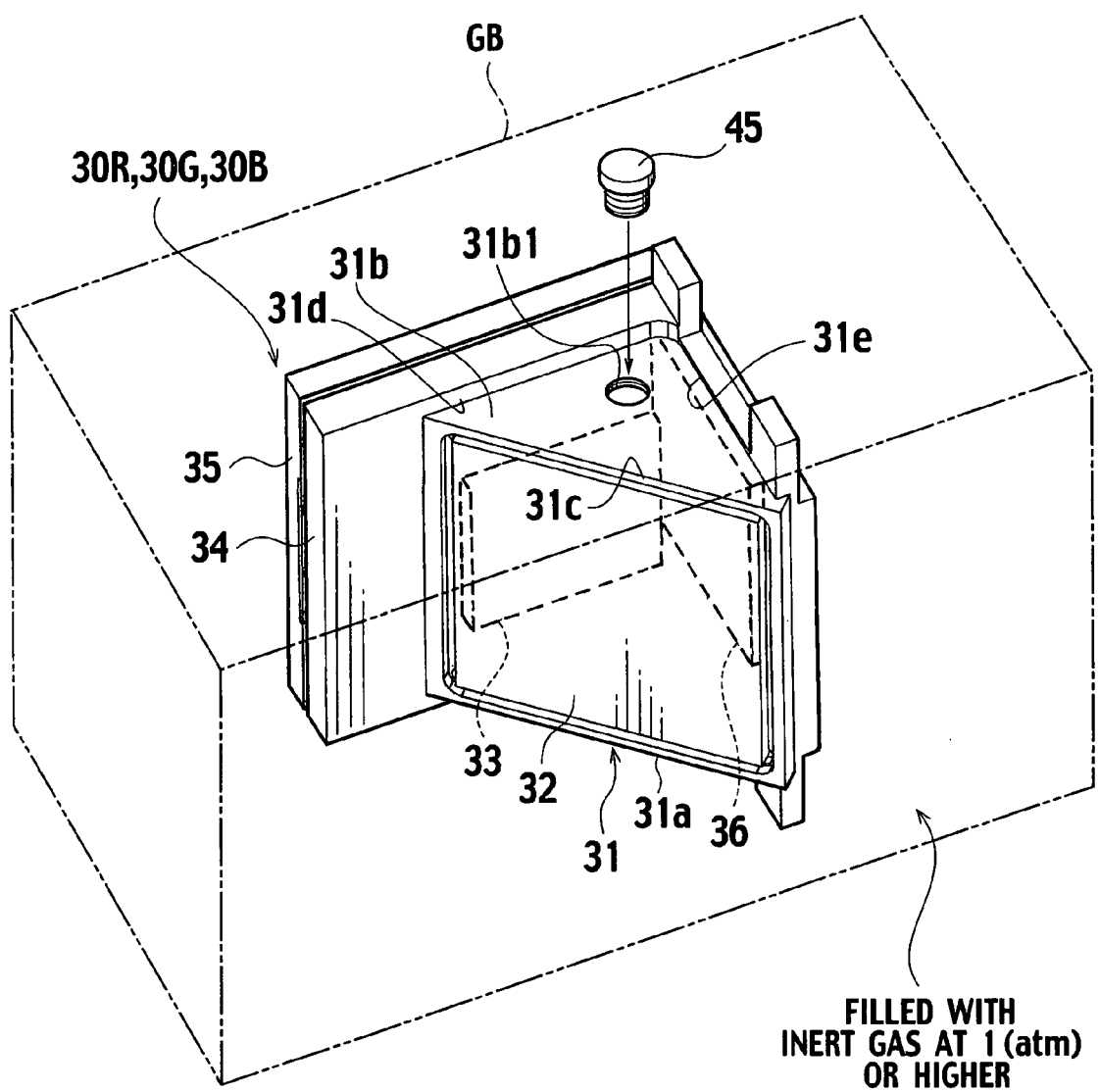
FIG. 7 is a perspective view for explaining how inert gas such as nitrogen or argon is filled into the inside of the right-angle triangular prism housing.

FIG. 7 is a perspective view for explaining how inert gas such as nitrogen or argon is filled into the inside of the right-angle triangular prism housing.

As illustrated in FIG. 7, the right-angle triangular prism housing 31 is placed inside a glove box GB, after the wire grid polarizer 32, the reflection type liquid crystal panel 33, and the transmission type polarizing plate 36 are adhered respectively on the first surface 31c, the second 31d, and the third surface 31e of the right-angle triangular prism housings 31 respectively for R, G, and B lights so as to assemble the reflection type liquid crystal panel assemblies 30R, 30G, 30B respectively for R, G, and B lights.

The inside of the glove box GB is filled with inert gas such as but not limited to nitrogen or argon at a pressure of one atmosphere or higher. The inert gas flows into the inside of the right-angle triangular prism housing 31 through a screw hole 31b1 provided so as to penetrate the upper plane 31b. Then, the lid 45 is screwed into the screw hole 31b1 and thus the inside of the right-angle triangular prism housing 31 is filled with the inert gas at a pressure of one atmosphere or higher. Next, the right-angle triangular prism housing 31 is taken out from the glove box GB.

Since the inside of the right-angle triangular prism housings 31 respectively for R, G, and B lights is filled with the inert gas preferably at 1 atmosphere or higher, it is possible to prevent dust and dirt from easily penetrating the right-angle triangular prism housing 31 from outside.

More preferably, the pressure is 1.2 atmospheres or higher because the minimum operating temperature of the projection type display apparatus 10A is generally guaranteed down to −20 degrees Celsius. Namely, when the pressure inside the right-angle triangular prism housing 31 is at 1.2 atmospheres or higher, the pressure can be kept at 1 atmosphere or higher even at a temperature of the minimum operating temperature.

By the way, while there is no particular upper limit in the pressure inside the right-angle triangular prism housing 31, it is preferably lower than 2 atmospheres taking into consideration deflection occurring in each glass plate constituting the right-angle triangular prism housing 31. More preferably, the pressure is 1.5 atmospheres or lower.

Second Embodiment

Figure 8:
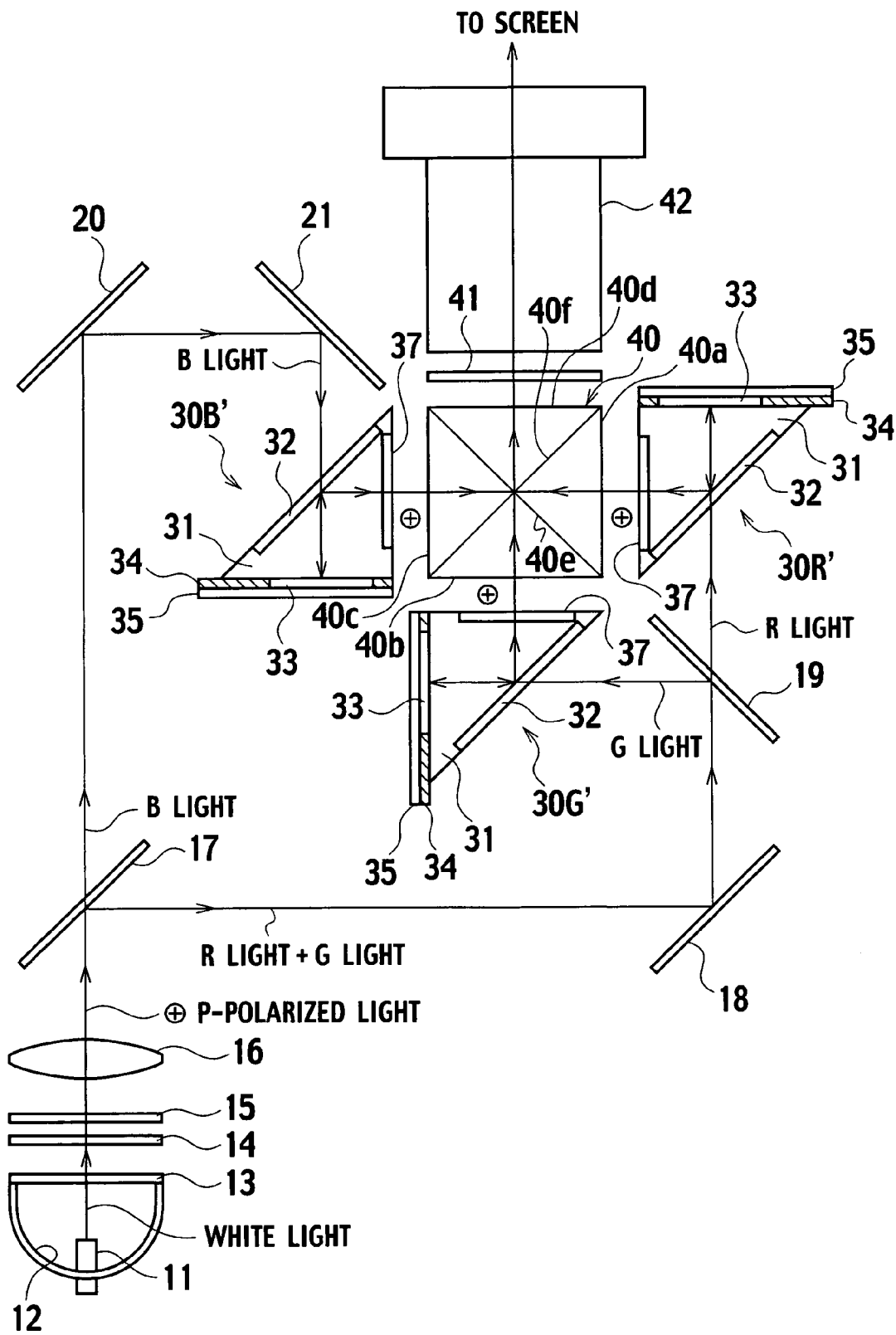
FIG. 8 is a plain view for explaining a projection type display apparatus according to a second embodiment of the present invention.
Figure 9:
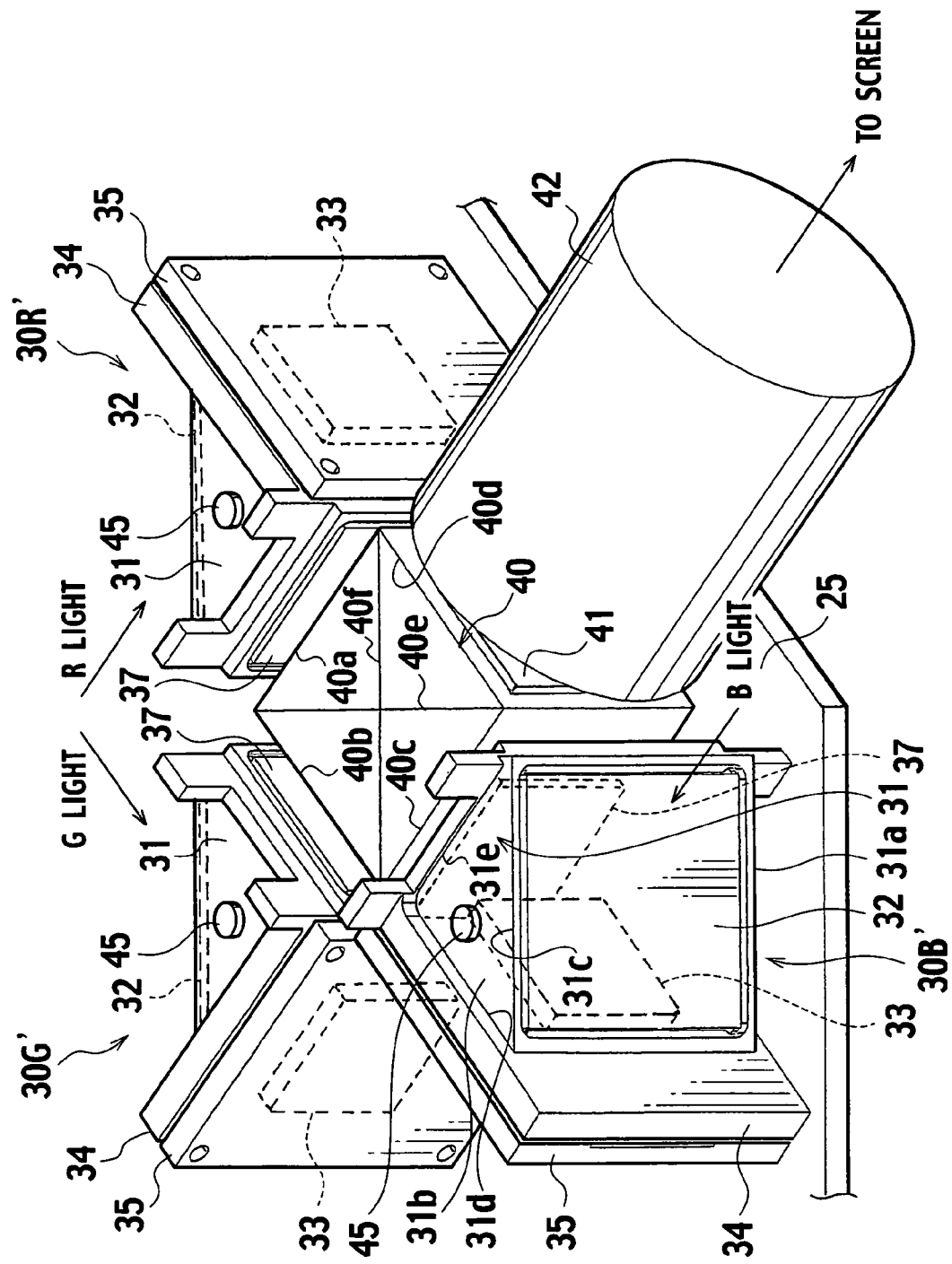
FIG. 9 is a perspective view of reflection type liquid crystal panel assemblies respectively for R, G, and B lights, a three-color combination cross dichroic prism and a projection lens of the projection type display apparatus according to the second embodiment, seen slantly upward from the reverse side of those components illustrated in FIG. 8.

FIG. 8 is a plain view for explaining a projection type display apparatus according to a second embodiment of the present invention. FIG. 9 is a perspective view of reflection type liquid crystal panel assemblies respectively for R, G, and B lights, a three-color combination cross dichroic prism and a projection lens of the projection type display apparatus according to the second embodiment, seen slantly upward from the reverse side of those components illustrated in FIG. 8.

As apparent when comparing FIGS. 8 and 9 with FIGS. 1 and 2, a projection type display apparatus 10B according to the second embodiment of the present invention is different from the projection type display apparatus 10A in that there is provided a reflection type polarizing plate 37 in reflection type liquid crystal panel assemblies 30R', 30G', 30B' respectively for R, G, and B lights of the projection type display apparatus 10B, instead of the transmission type polarizing plate 36 used in the first embodiment. The reflection type polarizing plate 37 serves as means for excluding unwanted polarized light by reflecting the unwanted first polarized component (P-polarized light) and allowing the second polarized component (S-polarized light) to pass therethrough. The following explanation is centered on the difference.

As illustrated in FIG. 9, in the projection type display apparatus 10B according to the second embodiment, the reflection type liquid crystal panel assemblies 30R', 30G', 30B' respectively for R, G, and B lights each have a right-angle triangular prism housing (a right-angle triangular housing) 31.

Similarly with the first embodiment, a wire grid polarizer 32 is adhered by an adhesive on a first surface 31c arranged inclined at an angle of 45 degrees with respect to an optical axis for light incoming from a light illumination units composed of the parts from a light source 11 (FIG. 8) through a color decomposition optical system 17, 19 (FIG. 8) and a reflection type liquid crystal panel 33 is adhered by an adhesive on a second surface 31d arranged perpendicular to an optical axis of the light that has passed through the wire grid polarizer 32 by use of an aperture mask plate 34, in the right-angle triangular prism housings 31 respectively for R, G, and B lights.

When it comes to the difference from the first embodiment, the reflection type polarizer 37 as means for excluding unwanted polarized light is adhered by an adhesive on a third surface 31e arranged perpendicular to an optical axis of the second polarization light that is reflected by the wire grid polarizer 32 after having been reflected by the reflection type liquid crystal panel 33, instead of the transmission type polarizing plate 36 in the first embodiment.

Again, similarly with the first embodiment, the inside space of the right-angle triangular prism housing 31 defined by a lower plane 31a, an upper plane 31b, the first surface 31c, the second surface 31d, and the third surface 31e is preferably filled with inert gas such as but not limited to nitrogen or argon at a pressure of 1 atmosphere or higher and lower than 2 atmospheres, which is easily carried out by using a lid 45 provided in the upper plane 31*b*. Since the right-angle triangular prism housing 31 is airtight, dust and dirt can be prevented from entering the housing 31. The right-angle triangular prism housing 31 being kept airtight is arranged so that the reflection type polarizing plates 37 respectively for R, G, and B lights oppose incident faces 40*a*, 40*b*, 40*c* of a three-color combination cross dichroic prism 40, respectively, leaving a predetermined distance therebetween.

One example of the adhesives that can be suitably used to adhere the wire grid polarizer 32, the reflection type liquid crystal panel 33 and the reflection type polarizing plate 37 onto the first surface 31*c*, the second surface 31*d*, and the third surface 31*e*, respectively, is an ultraviolet curable epoxy resin adhesive XNR-5516 (product name) of Nagase ChemiteX Corporation as is the case with the first embodiment. Specifically, since the ultraviolet curable epoxy resin adhesive XNR-5516 (product name) having a water vapor transmission rate of 17 g/m$^2$·day or less after being cured (or, in epoxy resin) was used, moisture resistance is improved in the right-angle triangular prism housing 31, which is true even under a severe environment with high fluctuations of temperature and humidity, thereby providing a reliable projection display apparatus 10B according to the second embodiment.

By the way, as the reflection type polarizing plate 37 as means for excluding unwanted polarized light, a wire gird polarizer is used. The wire grid polarizer is more excellent in heat resistance and light resistance than the transmission type polarizing plate 36 of absorption type, thereby offering a sufficient reliability against the high power light from the light source 11.

As apparent from the foregoing, the reflection type polarizing plates 37 respectively for R, G, and B lights exclude unwanted polarized light (P-polarized light) respectively in R, G, and B lights to allow the R, G, and B light S-polarized light to pass therethrough, the S-polarized light that has been reflected by the wire grid polarizers 32 respectively for R, G, and B lights after having been reflected by the reflection type liquid crystal panels 33 respectively for R, G, and B lights. Then, the R, G, and B lights that have passed respectively through the reflection type polarizing plates 37 respectively for R, G, and B lights are color-composed by the three-color combination cross dichroic prism 40.

Third Embodiment

Figure 10:
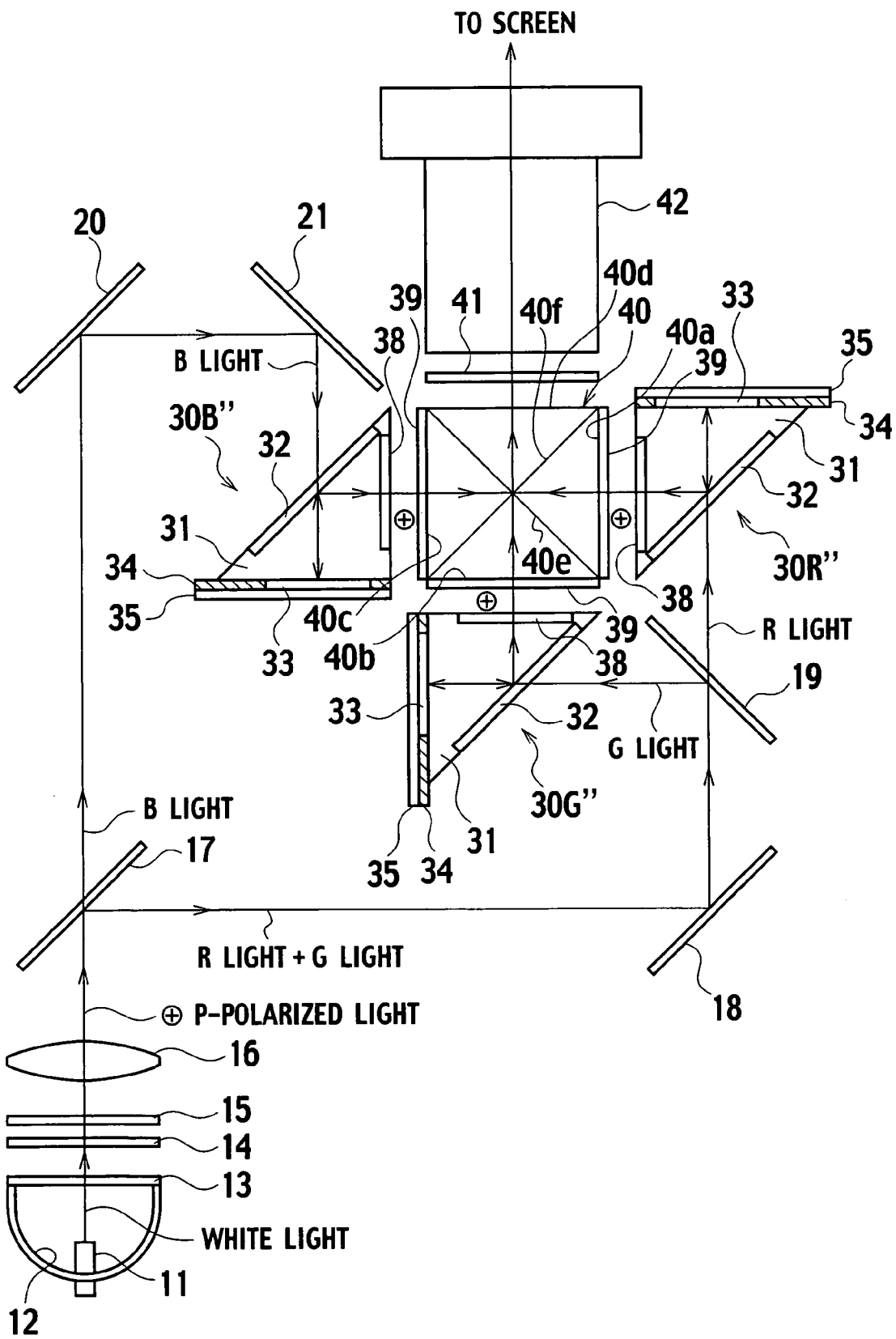
FIG. 10 is a plain view for explaining a projection type display apparatus according to a third embodiment of the present invention.
Figure 11:
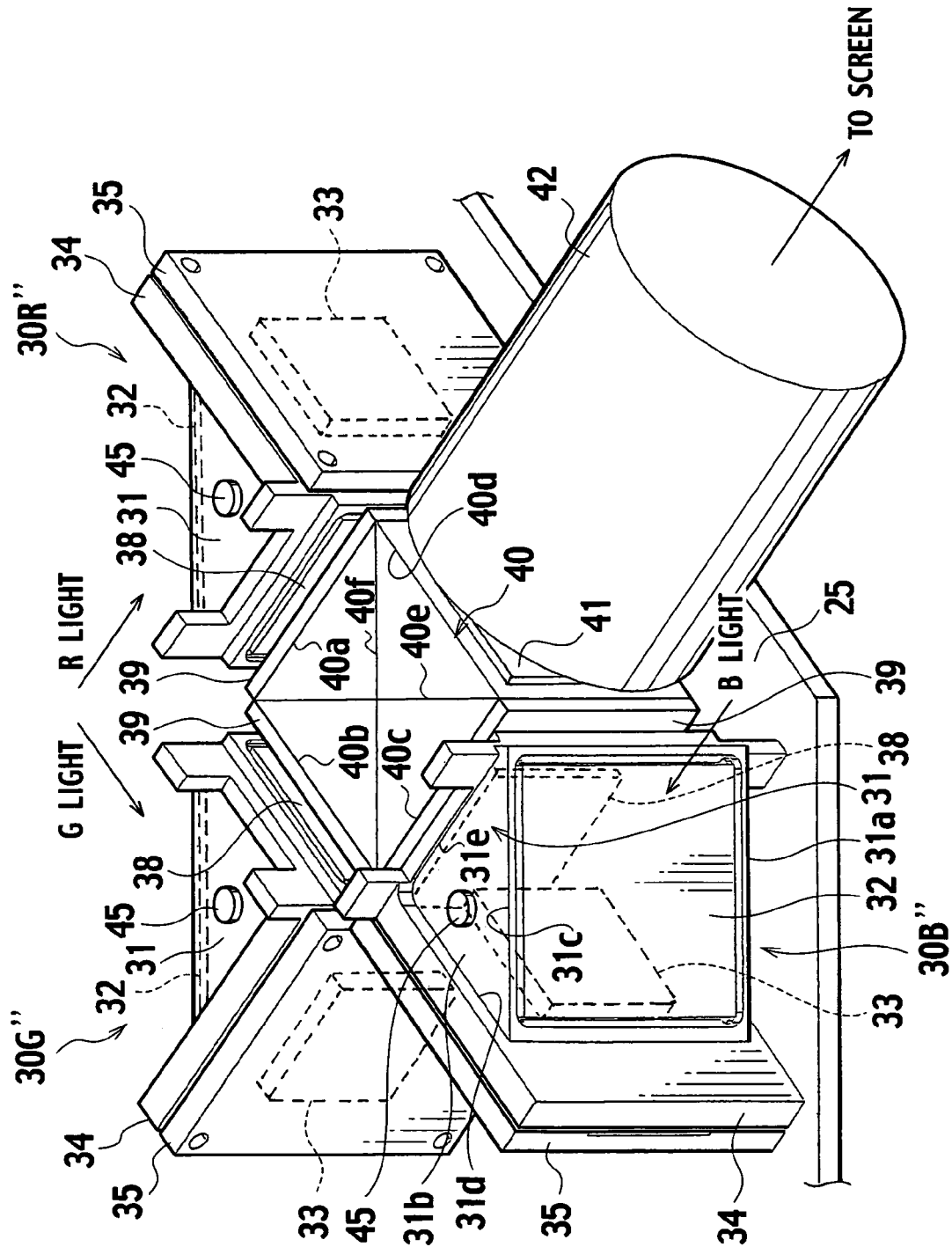
FIG. 11 is a perspective view of reflection type liquid crystal panel assemblies respectively for R, G, and B lights, a three color combination cross dichroic prism and a projection lens of the projection type display apparatus according to the third embodiment, seen slantly upward from the reverse side of those components illustrated in FIG. 10.

FIG. 10 is a plain view for explaining a projection type display apparatus according to a third embodiment of the present invention. FIG. 11 is a perspective view of reflection type liquid crystal panel assemblies respectively for R, G, and B lights, a three color combination cross dichroic prism and a projection lens of the projection type display apparatus according to the third embodiment, seen slantly upward from the reverse side of those components illustrated in FIG. 10.

As apparent when comparing FIGS. 10 and 11 with FIGS. 1 and 2, a projection type display apparatus 11C according to the third embodiment is different from the projection type display apparatus 10A in that there is provided a transparent glass plate 38 in reflection type liquid crystal panel assemblies 30R", 30G", 30B" respectively for R, G, and B lights of the projection type display apparatus 10C, instead of the transmission type polarizing plate 36 used in the first embodiment, and provided a transmission type polarizing plate 39 of optical absorption type attached respectively on a first incident surface 40*a*, a second incident surface 40*b*, and a third incident surface 40*c* of a three-color combination cross dichroic prism 40. The transmission type polarizing plate 39 serves as means for excluding unwanted polarized light. The following explanation is centered on the difference.

As illustrated in FIG. 11, in the projection type display apparatus 10C according to the third embodiment, the reflection type liquid crystal panel assemblies 30R", 30G", 30B" respectively for R, G, and B lights each have a right-angle triangular prism housing (a right-angle triangular housing) 31.

Similarly with the first embodiment, a wire grid polarizer 32 is adhered by an adhesive on a first surface 31*c* arranged inclined at an angle of 45 degrees with respect to an optical axis of the light incoming from a light illumination units composed of the parts from a light source 11 (FIG. 10) through a color decomposition optical system 17, 19 (FIG. 10) and a reflection type liquid crystal panel 33 is adhered by an adhesive on a second surface 31*d* arranged perpendicular to an optical axis of the light that has passed through the wire grid polarizer 32, by use of an aperture mask plate 34, in the right-angle triangular prism housings 31 respectively for R, G, and B lights.

Regarding the difference from the first embodiment, the transparent glass plates 38 are adhered by an adhesive respectively on a third surface 31*e* in the respective right-angle triangular prism housings 31 for R, G, and B lights, the third surface being arranged perpendicular to an optical axis of the light of the second polarization that is reflected by the wire grid polarizer 32 after having been reflected by the reflection type liquid crystal panel 33, instead of the transmission type polarizing plate 36 in the first embodiment.

Again, similarly with the first embodiment, the inside space of the right-angle triangular prism housing 31 defined by a lower plane 31*a*, an upper plane 31*b*, the first surface 31*c*, the second surface 31*d*, and the third surface 31*e* is preferably filled with inert gas such as but not limited to nitrogen or argon at a pressure of 1 atmosphere or higher and lower than 2 atmospheres, which is easily carried out by using a lid 45 provided in the upper plane 31*b*. Since the right-angle triangular prism housing 31 is airtight, dust and dirt can be prevented from entering the housing 31. The right-angle triangular prism housing 31 being kept airtight is arranged so that the transparent glass plates 38 respectively for R, G, and B lights oppose incident faces 40*a*, 40*b*, 40*c* of a three-color combination cross dichroic prism 40, respectively, leaving a predetermined distance therebetween.

The adhesive used suitably to adhere the wire grid polarizer 32, the reflection type liquid crystal panel 33 and the transparent glass plate 38 respectively onto the first surface 31*c*, the second surface 31*d*, and the third surface 31*e* is an ultraviolet curable epoxy resin adhesive XNR-5516 (product name) of Nagase ChemiteX Corporation as is the case with the first embodiment. Specifically, since the ultraviolet curable epoxy resin adhesive XNR-5516 (product name) having a water vapor transmission rate of 17 g/m$^2$·day or less after being cured (or, in epoxy resin) was used, moisture resistance of the right-angle triangular prism housing 31 is improved, which is true even under a severe environment with high fluctuations of temperature and humidity, thereby providing a reliable projection display apparatus 10B according to the third embodiment.

In addition to the above configuration, the transmission type polarizing plates 39 of optical absorption type for excluding a first polarized component included in the light that has passed through the transparent glass plates 38 respectively for R, G, and B light are attached respectively on the first incident surface 40*a*, the second incident surface 40*b*, and the third incident surface 40*c* of the three-color combination cross dichroic prism 40 by using the aforementioned ultraviolet curable epoxy resin adhesive XNR-5516 (product name).

As apparent from the foregoing, R, G, and B image light that have been produced by the reflection type liquid crystal panels 33 respectively for R, G, and B lights and reflected by the wire grid polarizers 32 respectively for R, G, and B lights pass through the transparent glass plates 38 respectively for R, G, and B lights. At this time, unwanted polarized light (P-polarization light) included in the image lights that has passed through the transparent glass plates 38 is excluded by the transmission type polarizing plates 39 attached on the incident surfaces 40$a$, 40$b$, 40$c$ respectively for R, G, and B lights of the three-color combination cross dichroic prism 40. Then, the R, G, and B image lights of S-polarization are color-combined by the three-color combination cross dichroic prism 40.

Fourth Embodiment

Figure 12:
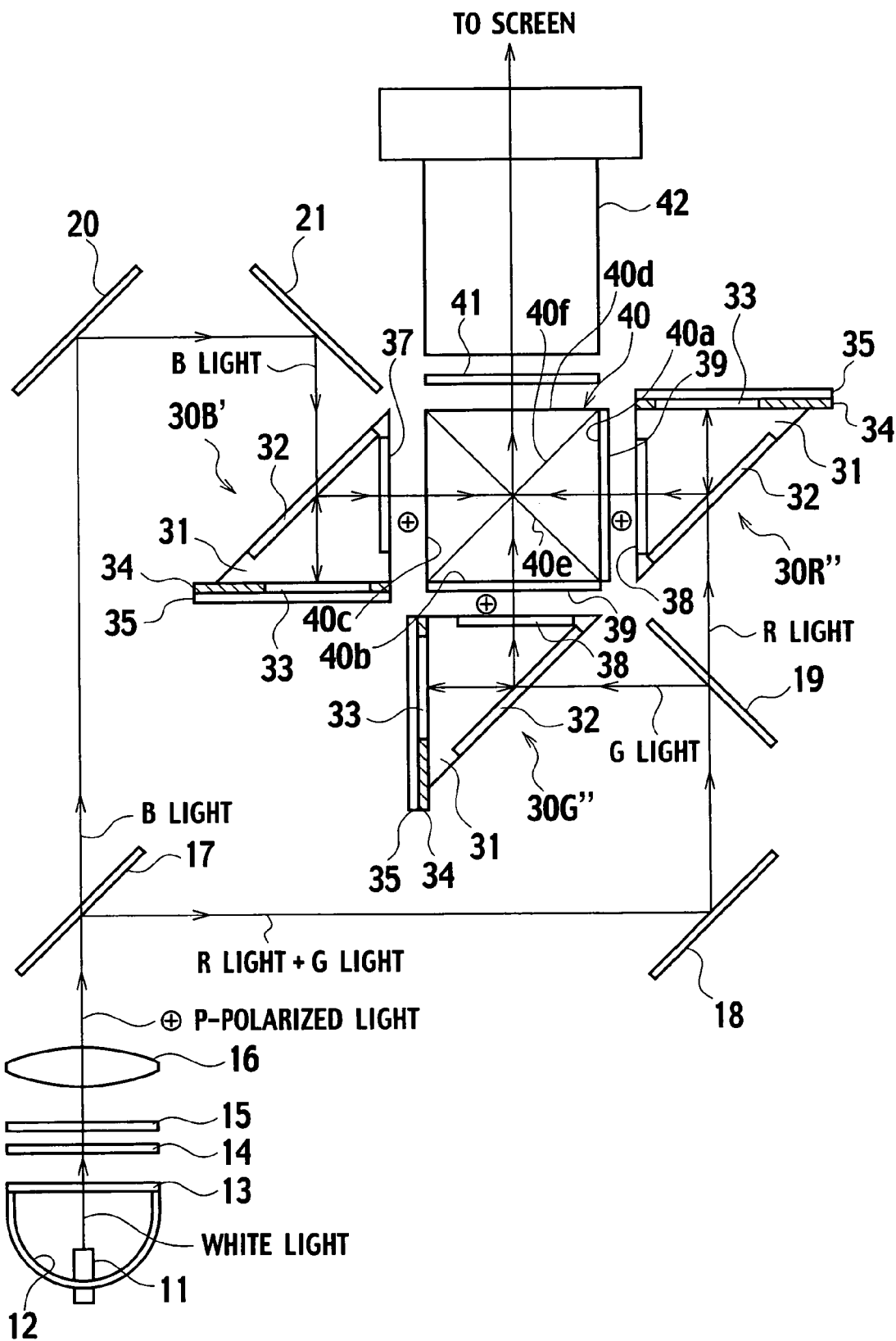
FIG. 12 is a plain view for explaining a projection type display apparatus according to a fourth embodiment of the present invention.
Figure 13:
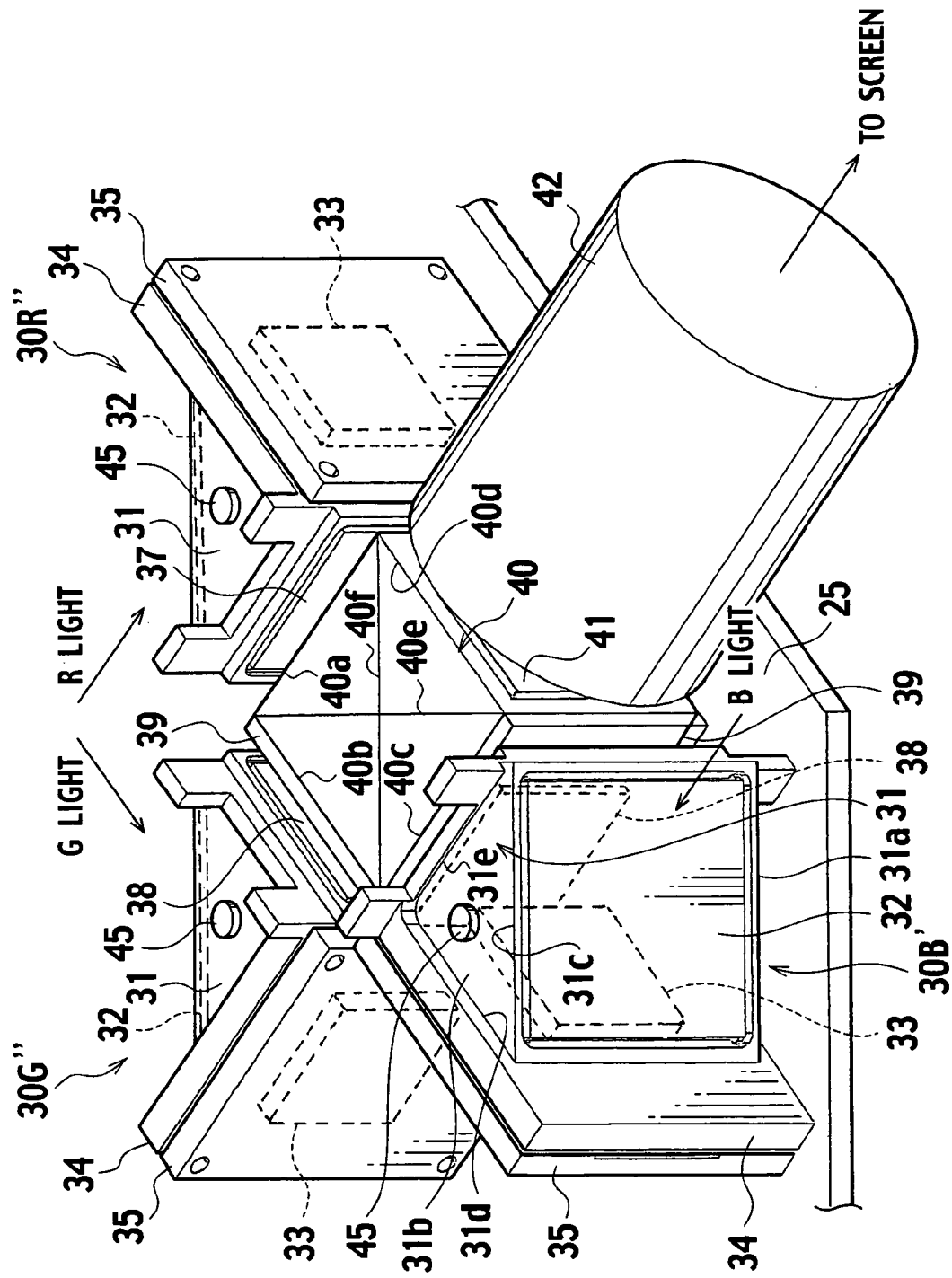
FIG. 13 is a perspective view of reflection type liquid crystal panel assemblies respectively for R, G, and B lights, a three color combination cross dichroic prism and a projection lens of the projection type display apparatus according to the fourth embodiment, seen slantly upward from the reverse side of those components illustrated in FIG. 12.

FIG. 12 is a plain view for explaining a projection type display apparatus according to a fourth embodiment of the present invention. FIG. 13 is a perspective view of reflection type liquid crystal panel assemblies respectively for R, G, and B lights, a three color combination cross dichroic prism and a projection lens of the projection type display apparatus according to the fourth embodiment, seen slantly upward from the reverse side of those components illustrated in FIG. 12.

As illustrated in FIGS. 12 and 13, a projection type display apparatus 10D according to the fourth embodiment is characterized in that transmission type polarizing plates 39 respectively for R and G lights as means for excluding unwanted polarized light are attached respectively on incident surfaces 40$a$, 40$b$ of a three-color combination cross dichroic prism 40, whereas a reflection type polarizing plate 37 for B light as means for excluding unwanted polarized light is used in a reflection type liquid crystal panel assembly 30B', the reflection type polarizing plate 37 being excellent in heat resistance and light resistance. Namely, the technical idea of the third embodiment is applied to reflection type liquid crystal panel assemblies 30R", 39G" and the technical idea of the second embodiment is applied to the reflection type liquid crystal panel assembly 30B'.

Similarly with the first embodiment, the wire grid polarizer 32 for R light is adhered by an adhesive on a first surface 31$c$ arranged inclined at an angle of 45 degrees with respect to an optical axis of the light coming from an illustration means for R light which is a part of the illustration means composed of the parts from a light source 11 (FIG. 12) through color decomposition optical systems 17, 19 (FIG. 12) and the reflection type liquid crystal panel 33 for R light is adhered by an adhesive on a second surface 31$d$ arranged perpendicular to an optical axis of the R light that has passed through the wire grid polarizer 32 for R light by use of an aperture mask 34 in the right-angle triangular prism housing (triangular column housing) 31 in the reflection type liquid crystal panel assembly 30R" for R light of the projection type display apparatus 10D according to the fourth embodiment, as illustrated in FIG. 13.

Also similarly with the first embodiment, the wire grid polarizer 32 for G light is adhered by an adhesive on a first surface 31$c$ arranged inclined at an angle of 45 degrees with respect to an optical axis of the light coming from an illustration means for G light which is a part of the illustration means composed of the parts from a light source 11 (FIG. 12) through color decomposition optical systems 17, 19 (FIG. 12) and the reflection type liquid crystal panel 33 for G light is adhered by an adhesive on a second surface 31$d$ arranged perpendicular to an optical axis of the G light that has passed through the wire grid polarizer 32 for G light by use of an aperture mask 34 in the right-angle triangular prism housing (triangular column housing) 31 in the reflection type liquid crystal panel assembly 30G" for G light.

Next, there will be explained a configuration which is different from the first embodiment but the same as the third embodiment regarding R and G lights. A transparent glass plate 38 for R light is adhered by an adhesive on a third surface 31$e$ perpendicular to an optical axis of the R light of a second polarization that is reflected by the wire grid polarizer 32 after having been reflected by the reflection type liquid crystal panel 33 for R light, instead of the transmission type polarizer 35 used in the first embodiment.

The transparent glass plate 38 for G light is adhered by an adhesive on the third surface 31$e$ perpendicular to an optical axis of the G light of the second polarization that is reflected by the wire gird polarizer 32 for G light after having been reflected by the reflection type liquid crystal panel 33 for G light, instead of the transmission type polarizing plate 36 used in the first embodiment.

The inside space of the right-angle triangular prism housing 31 for R and G lights defined by a lower plane 31$a$, an upper plane 31$b$, the first surface 31$c$, the second surface 31$d$, and the third surface 31$e$ is preferably filled with inert gas such as but not limited to nitrogen or argon at a pressure of 1 atmosphere or higher and lower than 2 atmospheres, which is easily carried out by using a lid 45 provided in the upper plane 31$b$. Since the right-angle triangular prism housing 31 is airtight, dust and dirt can be prevented from entering the housing 31. The right-angle triangular prism housing 31 being kept airtight is arranged so that the transparent glass plates 38 respectively for R and G lights oppose the transmission type polarizing plate 39 as means for excluding unwanted polarized light, the plate 39 being adhered by an adhesive respectively on incident faces 40$a$, 40$b$ of a three-color combination cross dichroic prism 40, leaving a predetermined distance therebetween.

The adhesive used to adhere the wire grid polarizer 32, the reflection type liquid crystal panel 33, and the transparent glass plate 38 on the first surface 31$c$, the second surface 31$d$, and the third surface 31$e$, respectively, is the ultraviolet curable epoxy resin adhesive XNR-5516 (product name) having a water vapor transmission rate of 17 g/m$^2$·day or less after being cured (or, in epoxy resin), which is also used in the first embodiment.

In the right-angle triangular prism housing (triangular column housing) 31 for B light in the reflection type liquid crystal panel assembly 30B' for B light, the wire grid polarizer 32 for B light is adhered by the adhesive on a first surface 31$c$ arranged inclined at an angle of 45 degrees with respect to an optical axis of the B light coming from the illumination units for B light On the other hand, when it comes to a configuration that is different from the first embodiment but the same as the second embodiment regarding B light, a reflection type polarizing plate 37 for B light as means for excluding unwanted polarized light is adhered by the adhesive on the third surface perpendicular to an optical axis of the B light of the second polarization that is reflected by the wire grid polarizer 32 for B light after having been reflected by the reflection type liquid crystal panel 33 for B light, instead of the transmission type polarizing plate 36.

In addition, the inside space of the right-angle triangular prism housing 31 for G light defined by a lower surface 31$a$, an upper surface 31b, the first surface 31c, the second surface 31d, and the third surface 31e is filled airtight with inert gas such as but not limited to nitrogen or argon at a pressure of 1 atmosphere or higher and lower than 2 atmospheres, which is carried out by using the lid 45 provided in the upper surface 31b. The right-angle triangular prism housing 31 for G light being kept airtight in order to prevent dust and dirt from easily entering therein is arranged so that the reflection type polarizer 37 for B light opposes the incident surface 40c of the three color combination cross dichroic prism 40 leaving a predetermined gap therebetween.

The adhesive used to adhere the wire grid polarizer 32, the reflection type liquid crystal panel 33, and the reflection type polarizing plate 37 respectively on the first surface 31c, the second surface 31d, and the third surface 31e is the ultraviolet curable epoxy resin adhesive XNR-5516 (product name) having a water vapor transmission rate of 17 g/m$^2$·day or less after being cured (or, in epoxy resin), which is also used in the first embodiment.

From the foregoing, according to the fourth embodiment, there is reliably provided the projection type display apparatus 10D in which moisture resistance is improved in the right-angle triangular prism housing 31 for R, G, and B light and dew formation is prevented even under a severe environment with high fluctuations of temperature and humidity.

In the fourth embodiment, the wire grid polarizer as the reflection type polarizing plate 37 is used only for G light. The wire grid polarizer is more expensive than the transmission type polarizer 39 of absorption type.

Taking into consideration a balance between costs and reliability, the transmission type polarizing plates 39 of absorption type are used for R and G lights and the reflection type polarizing plate 37 having a rather high heat and light resistance is used for B light. By the way, the reason why the reflection type polarizing plate 37 is exclusively used for B light is that the reflection type polarizing plated 37 is better suited for B light than the transmission type polarizing plate 39 since the transmission type polarizing plate 39 has a higher light absorbance so that it is heated to a rather higher temperature and has a lower light resistance for the light having shorter wavelengths, such as B light, thereby easily causing deterioration of polarization capability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection type display apparatus comprising:
    reflection type spatial light modulation elements provided respectively for red light, green light, and blue light,
    light illumination units provided respectively for red light, green light, and blue light, said light illumination units radiating respectively red light, green light, and blue light onto respective said reflection type spatial light modulation elements provided respectively for red light, green light, and blue light,
    wire grid polarizers provided respectively for red light, green light, and blue light, said wire grid polarizers allowing a first-polarization component included in the red light, the green light, and the blue light radiated by respective said light illumination units to pass therethrough and reflecting a second-polarization component that has been reflected and light-modulated by respective said reflection type spatial light modulation elements provided respectively for red light, green light, and blue light,
    housings provided respectively for red light, green light, and blue light, each of said housings taking a shape of a triangular-based hollow column defined by a triangular lower surface, a triangular upper surface, a first surface arranged inclined at an angle of 45 degrees with respect to an optical axis of the light incoming from said light illumination units, a second surface arranged perpendicular to an optical axis of the light that has passed through said wire grid polarizers, and a third surface, said first surface, said second surface, and said third surface being disposed between said triangular upper surface and said triangular lower surface,
        wherein said wire grid polarizers are adhered on respective said first surfaces by an adhesive, wherein said reflection type spatial light modulation elements are adhered on respective said second surfaces by said adhesive, and wherein said third surfaces are arranged so as to allow the second polarization component reflected respectively by said wire grid polarizers to pass therethrough,
    a color combination optical system that color-composes the red light, the green light, and the blue light of the second polarization that each have passed through respective said third surface of said housings provided respectively for red light, green light, and blue light, and allows the color-composed light to pass therethrough, and
    a projection lens that projects the color-composed light,
    wherein said adhesive has a water vapor transmission rate of 17 g/m$^2$·day or lower.

2. A projection type display apparatus as recited in claim 1, wherein transmission type polarizing plates provided respectively for red light, green light, and blue light, said transmission type polarizing plates excluding a first polarization component included in the red light, the green light, and the blue light that have been reflected by respective said wire grid polarizers and allowing a second polarization component to pass therethrough, are adhered by said adhesive respectively on said third surfaces of said housings provided respectively for red light, green light, and blue light.

3. A projection type display apparatus as recited in claim 1, wherein reflection type polarizing plates provided respectively for red light, green light, and blue light, said reflection type polarizing plates excluding a first polarization component included in the red right, the green light, and the blue light that have been reflected by respective said wire grid polarizers and allowing a second polarization component to pass therethrough, are adhered by said adhesive respectively on said third surfaces of said housings provided respectively for red light, green light, and blue light.

4. A projection type display apparatus as recited in claim 1, wherein transparent glass plates provided respectively for red light, green light, and blue light, said transparent glass plates allowing the red light, green light, and blue light that have been reflected by respective said wire grid polarizers, are adhered by said adhesive respectively on said third surfaces of said housings provided respectively for red light, green light, and blue light, and
    wherein transmission type polarizing plates provided respectively for red light, green light, and blue light, said transmission type polarizing plates excluding a first polarization component included in the red light, the green light, and the blue light that have been reflected by respective said wire grid polarizers and allowing a second polarization component to pass therethrough, are adhered by said adhesive respectively on said incident surfaces of said color combination optical system.

5. A projection type display apparatus as recited in claim 1, wherein a transparent glass plate allowing the red light reflected by said wire grid polarizer for red light to pass therethrough is adhered by said adhesive on said third surface of said housing for red light, wherein a transparent glass plate allowing the green light reflected by said grid polarizer for green light to pass therethrough is adhered by said adhesive on said third surface of said housing for green light, wherein a reflection type polarizing plate for blue light is adhered by said adhesive on said third surface of said housing for blue light, said reflection type polarizing plate excluding a first polarization component included in the blue light that has been reflected by said wire grid polarizer and allowing a second polarization component to pass therethrough, and wherein a transmission type polarizing plate is attached on an incident surface for red light of said color combination optical system, said transmission type polarizing plate excluding a first polarization component included in the red light that has passed through said transparent glass plate for red light, and a transmission type polarizing plate is attached on an incident surface for green light of said color combination optical system, said transmission type polarizing plate excluding a first polarization component included in the green light that has passed through said transparent glass plate for green light.

6. A projection type display apparatus as recited in claim 1, wherein said housings are filled with inert gas at a pressure range of equal to or higher than 1 atmosphere and lower than 2 atmospheres.

* * * * *